May 8, 1956   W. A. BEDFORD, JR.   2,744,708
FASTENING DEVICE
Filed July 21, 1951

INVENTOR:
WILLIAM A. BEDFORD JR.,
BY Robert E. Ross
AGENT.

2,744,708
Patented May 8, 1956

2,744,708
FASTENING DEVICE

William A. Bedford, Jr., North Scituate, Mass., assignor, by mesne assignments, to United-Carr Fastener Corporation, Boston, Mass., a corporation of Delaware Application July 21, 1951, Serial No. 237,863

4 Claims. (Cl. 248—73)

This invention relates generally to fastening devices, and has particular reference to a device for retaining a tubular member or the like in a channel-shaped supporting member.

The object of the invention is to provide a one-piece sheet metal tubing or wiring fastener for attaching a tube or a bundle of wires to the inside of a channel-shaped supporting member.

A further object of the invention is to provide such a fastener in which means is provided to properly position the fastener in the channel-shaped member, and other means is provided to retain the fastener therein and to retain a tubular member assembled therewith.

A further object of the invention is to provide such a fastener in which a pair of outwardly rounded arms forming a tubular member receiving space are each provided with a pair of members spaced longitudinally on the arms for engaging the adjacent wall portion of the tubular member.

Other objects of the invention will, in part, be obvious, and will, in part, appear hereinafter.

Figure 1:
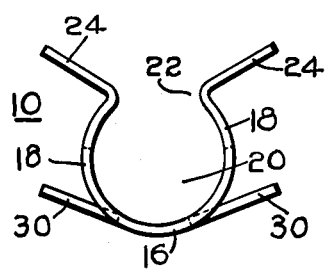
Fig. 1 is a view in elevation of a fastening member embodying the features of the invention.
Figure 2:
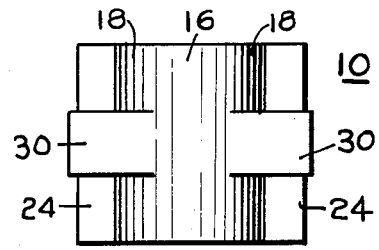
Fig. 2 is a bottom plan view of the fastener of Fig. 1.
Figure 3:
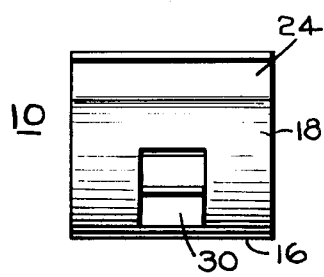
Fig. 3 is a view of the fastener of Fig. 1 as seen from the right side.
Figure 4:
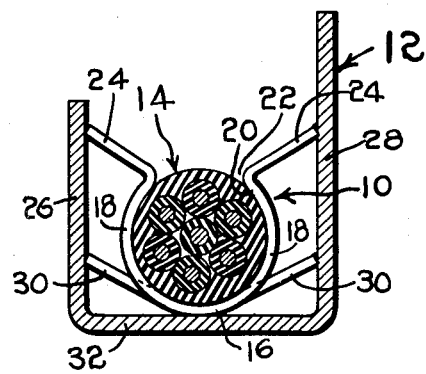
Fig. 4 is a view in elevation, partly in section, of the fastener member of Fig. 1 assembled into a channel-shaped support with a tube or the like retained therein.
Figure 5:
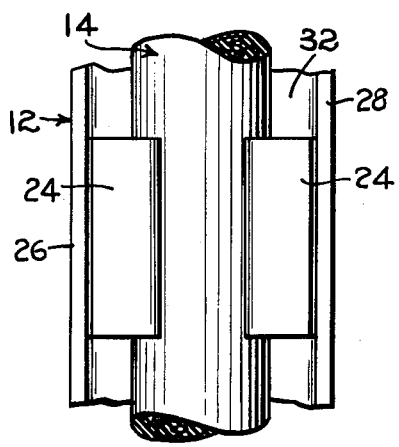
Fig. 5 is a top plan view of the assembly of Fig. 4.
Figure 6:
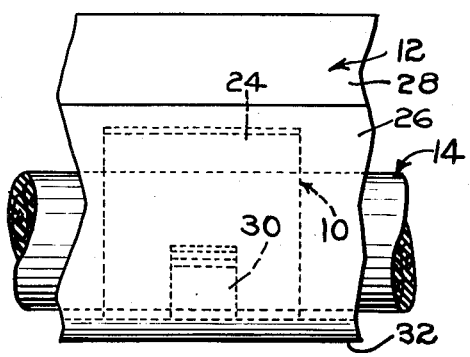
Fig. 6 is a view in side elevation of the assembly of Fig. 4.

Referring to the drawing, there is illustrated a fastening device 10, which is adapted for assembly into a channel-shaped support 12, to retain a tubular member 14 or the like in assembly therewith.

The fastener 10 comprises generally a U-shaped portion 16 formed by a pair of opposing flexible arms 18. The arms 18 are joined at one end and are rounded outwardly away from each other and then extend inwardly, to form a tube-receiving space 20 therebetween and a restricted entrance 22 leading to the space 20. The ends 24 of the arms are turned outwardly and are inclined upwardly away from the junction of the arms for frictional engagement with opposing wall portions 26 and 28 of the channel-shaped support. A pair of positioning members 30 are provided on the U-shaped portion 16 which extend outwardly from the lower portion thereof and are each inclined slightly upwardly to extend in the same general direction as the corresponding outwardly turned end 24 of the arms.

The fastener 10 is preferably formed of resilient material, and the construction of the device is such that the arms 18 are flexible toward and away from each other, but the positioning members 30 are relatively stiff.

To assemble a tube into the device and mount it into the support, the tube is first inserted through the entrance 22 into the space 20. The fastener is then forced down into the support channel between the wall portions 26 and 28. The positioning members 30, being relatively stiff, center the fastener in the support, and abut the opposing support walls for frictional engagement therewith. The ends 24 of the arms are normally spaced apart a greater distance than the distance between the walls of the support so that the ends of the arms must flex toward each other to pass between the walls. As the arms flex toward each other, the outwardly rounded portion of the arms firmly grips the tube 14 about the circumference thereof to securely retain it in the space 20, and the tendency of the arms to resile forces the ends 24 into tight frictional engagement with the opposing walls 26 and 28. The positioning members 30, in addition to assisting in retaining the fastener in the channel, also prevents tilting of the fastener in the channel which would result in unequal flexing of the arms.

Although the tube-receiving portion of the arms, in the illustrated embodiment, is shaped to receive a circular tube, it will be understood that the arms may have any convenient shape to receive tubes or bundles of wires having shapes other than circular. In some cases it may be desirable to insert the fastener into the channel so that the entrance 22 is disposed against the base 32 of the channel, in which case the ends 24 of the arms and the positioning members 30 can be inclined in a direction opposite to that shown in the illustrated embodiment, to facilitate assembly of the fastener.

Since certain other obvious modifications may be made in the device without departing from the scope of the invention, it is intended that all matter contained herein be interpreted in an illustrative and not in a limiting sense.

I claim:

1. A fastening device to retain a tubular member or the like in a channel-shaped receptacle, said device comprising a U-shaped member having opposing flexible arms with medial portions to receive the tubular member therebetween, said arms having outwardly turned ends extending laterally in opposite directions beyond the medial portions of the arms for frictional engagement with opposing wall portions of the channel-shaped receptacle, means extending inwardly from said arm portions to restrict the entrance to the space therebetween, and means having portions extending in opposite directions from the lower portion of the U-shaped member laterally beyond the medial portion of the arms for engagement with each of said opposing wall portions of the receptacle in spaced relation to the outwardly turned ends of the arms.

2. A fastening device to retain a tubular member or the like in a channel-shaped receptacle, said device comprising a U-shaped member formed by opposing flexible arms joined at one end to receive the tubular member therebetween, said arms having portions curved outwardly away from the junction and then inwardly to form a tubular member receiving space and a restricted aperture leading thereto, the ends of said arms being turned outwardly to extend laterally in opposite directions for frictional engagement with opposing wall portions of the channel-shaped receptacle, and tongue means having portions extending in opposite directions outwardly from the lower portion of the U-shaped member for abutting said opposing wall portions of the channel-shaped member in spaced relation to the outwardly turned ends of the arms, the ends of said arms and the ends of said tongues extending laterally beyond the outwardly curved portion of the arms.

3. A fastening device to retain a tube or the like in a channel-shaped support, said device being formed of a single piece of sheet metal and comprising a tube-receiving portion formed by a pair of opposing arms joined at one end and having portions rounded outwardly away from each other and end portions extending inwardly toward each other to form a tube-receiving space and a restricted entrance leading thereto, the ends of said arms being turned laterally to extend beyond the outwardly rounded portions of the arms for frictional engagement with opposing wall portions of the channel shaped support, and positioning tabs formed from the arms and extending in opposite directions outwardly from the junction of the arms laterally beyond the outwardly rounded portions of the arms to abut opposing channel walls in spaced relation to the outwardly turned ends of the arms, the distance between the ends of the tabs being substantially equal to the distance between the ends of the arms.

4. A fastener assembly comprising a channel-shaped receptacle, a fastening device assembled between opposing walls of the channel-shaped receptacle, and a tubular member retained by the fastener, said fastener comprising a U-shaped member having opposing flexible arms with medial portions to receive the tubular member therebetween, said arms having outwardly turned ends extending laterally in opposite directions beyond the medial portions of the arms into frictional engagement with opposing wall portions of the channel-shaped receptacle, means extending inwardly from said arm portions to restrict the entrance to the space therebetween, and means having tongues extending in opposite directions from the lower portion of the U-shaped member into engagement with each of said opposing wall portions of the receptacle in spaced relation to the outwardly turned ends of the arms, the ends of said arms and the ends of said tongues extending laterally beyond the medial portions of the arms.

References Cited in the file of this patent

UNITED STATES PATENTS

| | | |
|---|---|---|
| 501,439 | Reznor | July 11, 1893 |
| 1,217,398 | Bonnell | Feb. 27, 1917 |
| 1,398,519 | Hosch | Nov. 29, 1921 |
| 2,216,219 | Wiley | Oct. 1, 1940 |
| 2,269,177 | Borchert | Jan. 6, 1942 |
| 2,469,451 | Burrus | May 10, 1949 |
| 2,511,808 | Petri | June 13, 1950 |
| 2,535,879 | Tinnerman | Dec. 26, 1950 |
| 2,541,908 | Attwood | Feb. 13, 1951 |